United States Patent [19]

Pike

[11] 3,857,984

[45] Dec. 31, 1974

[54] METHOD OF CONSERVING FORAGE WITH ACID AND NITRITE MIXTURE

[75] Inventor: Ian Holden Pike, Stockton-on-Tees, England

[73] Assignee: Imperial Chemical Industries Limited, London, England

[22] Filed: Sept. 15, 1972

[21] Appl. No.: 289,744

[30] Foreign Application Priority Data
Sept. 23, 1971 Great Britain.................... 44403/71

[52] U.S. Cl........................ 426/335, 426/54, 426/74
[51] Int. Cl............................................... A23k 3/03
[58] Field of Search....... 99/8 R, 8 E, 8 D, 9, 2 ND, 99/150, 153; 426/54, 335, 74

[56] References Cited
UNITED STATES PATENTS

| | | |
|---|---|---|
| 1,935,754 | 11/1933 | Virtanen................................. 99/8 |
| 2,078,537 | 4/1937 | Henglein et al........................... 99/8 |
| 2,160,167 | 5/1939 | Pfeiffer..................................... 99/8 |
| 2,263,746 | 11/1941 | Stauf et al................................. 99/8 |
| 2,735,775 | 2/1956 | Bronstein, Jr. et al. .................. 99/8 |
| 2,885,289 | 5/1959 | Busch....................................... 99/8 |

Primary Examiner—A. Louis Monacell
Assistant Examiner—Curtis P. Ribando
Attorney, Agent, or Firm—Cushman, Darby & Cushman

[57] ABSTRACT

The nutritional value of silage is enhanced by treating the forage to be conserved with at least one inorganic nitrite and at least one acid which may be a common mineral acid or a solid acid exemplified by sulphamic acid.

5 Claims, No Drawings

METHOD OF CONSERVING FORAGE WITH ACID AND NITRITE MIXTURE

This invention relates to a method of, and additives for, improving the nutritional value of conserved forage.

Conservation of forage by ensilage generally results in large losses of nutrients mainly as a result of prolonged respiration of the plant after harvesting and undesirable changes during fermentation. The present invention employs additives which will markedly reduce these losses, producing silage of enhanced nutritional value.

The conservation of forage by ensiling involves a controlled anaerobic fermentation. Lactobacilli degrade carbohydrate to lactic acid thereby reducing pH. Undesirable bacteria, typified by *Clostridia*, are selectively inhibited at low pH. Production of noxious amines and butyric acid for example is prevented, though degradation of protein still occurs. It is now known that lactic acid reduces intake in ruminants. In addition, although lactic acid can be utilized by the ruminant as an energy source, unlike water-soluble carbohydrates it is not utilized by rumen bacteria in the synthesis of protein from non-protein forms of nitrogen. Therefore from a nutritional standpoint it is desirable to conserve forage in a form resembling the original material as closely as possible. This is best achieved by ensiling in such a way that the forage remains chemically stable without fermentation occurring.

Accordingly the present invention provides a method of improving the nutritional value of silage which comprises the step of adding to the forage to be conserved at least one acid and at least one nitrite. The acid rapidly reduces the pH of the forage, reducing respiration and preventing proliferation of undesirable bacteria, typified by *Clostridia*, which are inhibited at low pH. In the presence of the acid in the silage, oxides of nitrogen are released from the nitrite, and they diffuse through the silage killing bacteria and reducing fermentation. Prevention of microbial deterioration of the silage after the oxides of nitrogen have diffused out of the silage is achieved by the residual acid additive. It has been found that bacteria are killed and inhibited to a much greater extent by the action of oxides of nitrogen from nitrite in the presence of acids than by either nitrite application alone or acid application alone.

Examples of acids appropriate for use in the present invention are hydrochloric, sulphuric and phosphoric acids, or mixtures thereof. However, the invention is not restricted to the use of these common acids. In one preferred form of the invention, a solid acid such as sulphamic acid is used. This acid, commonly available as a solid, is extremely convenient since it is easy to handle and distribute, thus avoiding the difficulties commonly encountered in handling strong acids in liquid form and minimising storage and distribution costs.

Of the common acids, sulphuric acid is preferred because it has a lower acid equivalent weight (i.e., is a stronger acid) and has a lower vapour pressure, therefore presenting less difficulty in spraying than hydrochloric acid.

Examples of nitrites appropriate for use in the present invention are sodium and potassium nitrite, although the invention is not restricted to these particular nitrites.

One preferred combination is that of sulphamic acid and sodium nitrite, both of which can be stored and distributed as solids, for example in simple separate plastics packs, and then either added to the forage to be conserved as fine powders or alternatively dissolved in water on the spot and applied by spraying onto the forage.

In all cases, the acid and nitrite are either applied separately or immediately after mixing, since they start reacting with one another at once and, if mixed too soon, their beneficial effect on the forage is diminished.

For best results the acid is applied in the range 0.1 to 3.0% by weight of the forage with the range 0.2–0.6% being preferred, the concentration of the acid being in the range 90–10% by volume, e.g., 0.1% of acid of strength 90%(v/v) with the preferred concentration being 30–60% by volume. The nitrite may be added so that the treated forage contains 10 to 2,000 ppm by weight, the preferred addition rate being 50 to 300 ppm by weight of the forage.

Although the addition of acids alone to forage to aid conservation has been known for a long time there have been several disadvantages associated with it which have limited its practical utilisation. The well-knoen AIV process (named after A.I. Virtanen) involved treating grass with acid prior to ensilage, a rate of 12 gallons of 2N acid per ton of grass being recommended. The high levels used in the AIV process often resulted in relatively high levels of residual acid in the silage which reduced intake by ruminants and could cause acidosis. The present invention employs much lower levels of acid than the AIV process and because of the simultaneous use of nitrite, this gives savings in transportation and handling costs and at the same time produces silage of higher nutritional value. More recently organic additives such as formic acid and formaldehyde have been introduced to the forage additives market but the high vapour pressure associated with these materials can cause handling problems in the vicinity of the material to which they are being applied. The inorganic acids and nitrites used in the present invention have significant advantages in this respect due to their low vapour pressure.

Similarly the method of the present invention is more effective than using a nitrite alone because of its more powerful bacteriacidal action and because the long lasting acid effects are still present after the nitrite effect has disappeared.

The following examples illustrate the present invention and its advantages. They are offered by way of illustration only, and the scope of the invention is not limited by these examples.

EXAMPLE 1

Four typical silage bacteria, (a) *Clostridium butyricum*, (b) *Staphylococcus aureus*, (c) *Lactobacillus plantarum* and (d) *Lactobacillus brevis* were separately anaerobically cultured on a medium which simulated silage. Growth was assessed by measuring the turbidity of the medium in a nephalometer. The combination of mineral acid and nitrite was far more effective in inhibiting growth of silage micro-organisms, particularly (a) and (b), than either mineral acid alone or nitrite alone.

| Minimal Level of Additive giving Total Inhibition | | | | |
|---|---|---|---|---|
| Additive | C Butyricum | S Aureus | L Plantarum | L Brevis |
| Mineral acid Mixture (M)* | 0.3 | 0.2 | >0.4 | >0.4 |
| 110 ppm by volume sodium nitrite + M* | <0.01M | 0.05M | >0.3M | >0.3M |
| Sodium Nitrite alone | >110ppm | >110ppm | >2000ppm | >2000ppm |

> Growth inhibited above; < growth inhibited below
*Mineral acid mixture, M, was concentrated hydrochloric, sulphuric and phosphoric acids and water, mixed in the ratio 6:3:1:3 v/v As indicated in the foregoing table lower levels of mineral acid were required to inhibit the growth of four typical silage micro-organisms in the presence of sodium nitrite. In the same way lower levels of sodium nitrite were required to inhibit growth of these micro-organisms in the presence of acid.

EXAMPLE 2

Heavily fertilized cocksfoot grass cut at 50% ear emergence was ensiled using no additive (control $C_1$), a low level of mineral acid alone ($A_L$) or with sodium nitrite ($A_L N$), a high level of mineral acid alone ($A_H$) or with sodium nitrite ($A_H N$), sodium nitrite alone (N), and a further treatment with no additive (control $C_2$). The grass was low in water-soluble carbohydrate and dry-matter and high in crude-protein, a composition which would be expected to favour an undesirable fermentation. The type and amount of additives used were as follows:

| Treatment | Additive | Application Rate |
|---|---|---|
| 1 Control $C_1$ | No additive | — |
| 2 Low acid $A_L$ | Mineral acid mixture L | 1% |
| 3 Low acid + nitrite $A_L N$ | Mineral acid mixture L + 3% sodium nitrite | 1% |
| 4 High acid $A_H$ | Mineral acid mixture H | 1% |
| 5 High acid + nitrite $A_H N$ | Mineral acid mixture H + 3% sodium nitrite | 1% |
| 6 Sodium nitrite N | Sodium nitrite (10% w/v) | 1% |
| 7 Control $C_2$ | No additive | — |

Composition of mineral acid mixtures, % by volume:

| | Acid Mixture L | Acid Mixture H |
|---|---|---|
| Concentrated hydrochloric acid | 10.9 | 23.0 |
| Concentrated sulphuric acid | 4.6 | 11.5 |
| Concentrated phosphoric acid | 1.5 | 3.9 |
| Water | 83.0 | 61.6 |

The composition of the silages produced are given below, the figures for "control" being the average of $C_1$ and $C_2$:

| | Dry-Matter | pH | WSC*+ | Lactic Acid* | Ammonia* | True Protein* Crude Protein |
|---|---|---|---|---|---|---|
| Control | 24.8 | 4.57 | 0.64 | 5.7 | 0.71 | 0.61 |
| $A_L$ | 22.9 | 4.34 | 1.13 | 5.0 | 0.68 | 0.62 |
| $A_L N$ | 24.2 | 4.28 | NA | 5.2 | 0.71 | 0.62 |
| $A_H$ | 22.6 | 4.14 | 1.33 | 4.9 | 0.72 | 0.62 |
| $A_H N$ | 23.4 | 4.28 | 1.78 | 4.1 | 0.71 | 0.65 |
| N | 23.0 | 4.28 | 0.59 | 7.0 | 0.66 | 0.52 |

NA Not available
* Determined as % by weight of dry-matter
+Water soluble carbohydrate The foregoing table indicates that the extent of fermentation, as measured by degradation of carbohydrate (i.e., the level of water soluble carbohydrate remaining in the silage), by production of lactic acid, and by degradation of true protein, is less in all acid treatments than in the controls. It also shows that treatment $A_H N$ leads to less degradation than when either acid alone or nitrite alone is used. This result confirms the microbiological assessment given in Example 1. The lower production of lactic acid by treatment $A_H N$ shown in the above table is also advantageous since it is well known that lactic acid reduces the intake of feed by ruminant animals.

EXAMPLE 3

This example illustrates the relative effects of the present invention compared with acid alone such as used in the AIV process. A grass sward, predominantly tall fescue, was ensiled with the following additives at the following rates:

| Treatment No. | Additive | Application Rate % by weight | Acid Equivalent added mg/100 kg grass |
|---|---|---|---|
| 1 | Control — nil additive | — | — |
| 2 | Acid mixture* alone at high level | 0.50 | 4.85 |
| 3 | Low acid level (50% $H_2SO_4$) plus sodium nitrite (110 ppm + by weight) | 0.25 | 2.55 |

*The acid used was a mixture of conc HCl, conc $H_2SO_4$, conc $H_3PO_4$, and water, in the ratio 12:3:2:6 parts by volume.
+The 110 ppm of sodium nitrite on the grass was obtained by applying 0.22% by weight of an aqueous solution of sodium nitrite which contained 4.8% by weight of sodium nitrite.

Silage made using each of these three treatments was then fed to Friesian dairy cows, eight cows per treatment and intake measured. The results obtained were:

| Treatment No. | Silage pH | Silage Intake (kg/day) | Silage Dry-Matter Intake (kg/day) |
|---|---|---|---|
| 1 | 5.2 | 40.8 | 6.9 |
| 2 | 4.8 | 41.8 | 7.5 |
| 3 | 5.5 | 44.7 | 8.2 |

These results show that intake is highest with silage undergoing treatment 3, i.e., nitrite + acid according to the present invention.

I claim:

1. A method of improving the nutritional value of silage which comprises the step of adding to the forage to be conserved acid in an amount from 0.1% to 3% by weight of the forage, said acid having a concentration in the range of 10% to 90% by volume and being selected from the group consisting of hydrochloric acid, sulfuric acid, phosphoric acid and mixtures thereof, and at least one nitrite in an amount from 10 to 2,000 ppm by weight of the forage selected from the group consisting of sodium nitrite and potassium nitrite.

2. A method according to claim 1 wherein the concentration of the acid is in the range of 30% to 60% by volume, the acid is added in an amount from 0.2% to 0.6% and the nitrite is added in an amount from 50 to 300 ppm.

3. A method of improving the nutritional value of silage which comprises the step of adding to the forage to be conserved sulfamic acid in an amount from 0.1% to 3% by weight of the forage and at least one nitrite in an amount from 10 to 2,000 ppm by weight of the forage selected from the group consisting of sodium nitrite and potassium nitrite.

4. A method according to claim 3 wherein the nitrite and sulfamic acid are applied to the forage as solid powders.

5. A method according to claim 3 wherein the sulfamic acid is added in an amount from 0.2% to 0.6% and the nitrite is added in an amount from 50 to 300 ppm.

* * * * *